US011863947B2

(12) United States Patent
Farahbakhsh et al.

(10) Patent No.: US 11,863,947 B2
(45) Date of Patent: Jan. 2, 2024

(54) ROAD NOISE-CANCELLATION SYSTEM RESPONSIVE TO ENTERTAINMENT AUDIO

(71) Applicant: Bose Corporation, Framingham, MA (US)

(72) Inventors: Siamak Farahbakhsh, Waltham, MA (US); Rohan Rohilla, Boxborough, MA (US); Travis L. Hein, Holliston, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/062,315

(22) Filed: Dec. 6, 2022

(65) Prior Publication Data

US 2023/0102460 A1 Mar. 30, 2023

Related U.S. Application Data

(62) Division of application No. 17/325,928, filed on May 20, 2021, now Pat. No. 11,564,034.

(Continued)

(51) Int. Cl.
*H04R 3/02* (2006.01)

(52) U.S. Cl.
CPC ........... *H04R 3/02* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 8,355,512 | B2 * | 1/2013 | Pan | G10K 11/17825 381/71.11 |
| 2008/0095383 | A1 | 4/2008 | Pan et al. | |
| 2014/0286505 | A1 | 9/2014 | Sakamoto et al. | |

FOREIGN PATENT DOCUMENTS

| | | |
|---|---|---|
| EP | 2375408 | 10/2011 |

OTHER PUBLICATIONS

International Search Report and the Written Opinion of the International Searching Authority, International Patent Application No. PCT/US2021/033410, pp. 1-11, dated Sep. 8, 2021.

(Continued)

*Primary Examiner* — Kenny H Truong
(74) *Attorney, Agent, or Firm* — Bond, Schoeneck & King, PLLC

(57) ABSTRACT

A vehicle-implemented, adaptive noise-cancellation system responsive to entertainment audio is provided. The noise-cancellation system uses reference signal from a reference sensor, such as an accelerometer, to generate a noise-cancellation signal to destructively interfere with road noise in the vehicle cabin. A first set of entertainment audio thresholds triggers the system to enable or disable adaptation of an adaptive filter of the noise-cancellation system. A second set of entertainment audio thresholds triggers the system to enable, attenuate, or disable the noise-cancellation signal. As the entertainment audio increases, the system first disables the adaptation of the adaptive filter, then attenuates the noise-cancellation signal, then completely disables the noise-cancellation signal. Conversely, as the entertainment audio decreases, the system first enables the noise-cancellation signal, then reduces the attenuation (thereby increasing the amplitude) of the noise-cancellation signal, and then enables the adaptation of the adaptive filter.

20 Claims, 4 Drawing Sheets

Related U.S. Application Data

(60) Provisional application No. 63/028,179, filed on May 21, 2020.

(56) References Cited

OTHER PUBLICATIONS

International Preliminary Report On Patentability, International Patent Application No. PCT/US2021/033410, pp. 1-8, dated Nov. 17, 2022.

* cited by examiner

ROAD NOISE-CANCELLATION SYSTEM RESPONSIVE TO ENTERTAINMENT AUDIO

CROSS-REFERENCE TO RELATED APPLICATIONS

The application is a divisional application of U.S. patent application Ser. No. 17/325,928, filed on May 20, 2021, which application claims priority to U.S. Provisional Patent Application Ser. No. 63/028,179, filed on May 21, 2020, and titled "Road Noise Cancellation System Responsive to Entertainment Audio," which applications are herein incorporated by reference in their entireties.

BACKGROUND

This disclosure is generally directed to systems and methods for controlling a noise-cancellation output signal based on entertainment audio. Various examples are directed to systems and methods for controlling a noise-cancellation output signal based on entertainment audio.

SUMMARY

All examples and features mentioned below can be combined in any technically possible way.

Generally, in an aspect, a vehicle implemented noise-cancellation system is provided. The vehicle implement noise-cancellation system includes a noise-cancellation subsystem. The noise-cancellation system is disposed in a vehicle. The noise-cancellation subsystem includes an adaptive filter. The adaptive filter is adjusted according to a reference signal and an error signal. The adaptive filter outputs a noise-cancellation signal, which, when transduced into a noise-cancellation audio signal by a speaker, reduces road noise within at least one zone within a cabin of the vehicle.

The vehicle implemented noise-cancellation system further includes an entertainment audio monitoring subsystem. The entertainment audio monitoring subsystem is configured to generate an entertainment audio monitor signal. The entertainment audio monitor signal corresponds to audio originating from an entertainment audio system of the vehicle.

The entertainment audio monitoring subsystem is further configured to disable the noise-cancellation audio signal when an amplitude of the entertainment audio monitor signal is greater than a cancellation disable threshold.

The entertainment audio monitoring subsystem is further configured to attenuate the noise-cancellation audio signal when the amplitude of the entertainment audio monitor signal is greater than a cancellation enable threshold. The attenuation of the noise-cancellation audio signal increases relative to the amplitude of the entertainment audio monitor signal when the amplitude of the entertainment audio monitor signal is less than the cancellation disable threshold.

According to an example, the entertainment audio monitoring subsystem is further configured to disable adaptation of the adaptive filter when the amplitude of the entertainment audio monitor signal is greater than an adaptation freeze threshold. The entertainment audio monitoring subsystem is further configured to, subsequent to disabling adaptation of the adaptive filter, enable adaptation of the adaptive filter when the amplitude of the entertainment audio monitor signal is less than an adaptation enable threshold.

According to an example, the entertainment audio monitor signal is based on at least one of one or more entertainment audio signals generated by the entertainment audio system. In further examples, the one or more entertainment audio signals include a left channel audio signal and a right channel audio signal, and the entertainment audio monitor signal is a root-mean-square (RMS) estimate of the left channel audio signal and the right channel audio signal. In even further examples, the one or more entertainment audio signals further include a plurality of output audio channel signals based on the left channel audio signal and/or the right channel audio signal, and the entertainment audio monitor signal is a weighted RMS estimate of the plurality of output audio channel signals.

According to an example, the vehicle implemented noise-cancellation system further comprises an accelerometer configured to generate the reference signal. The accelerometer may be arranged to detect vibrations in a chassis of the vehicle.

According to an example, the error signal may be generated by an error sensor arranged within the cabin of the vehicle. The error sensor arranged within one of the at least one zone within the cabin of the vehicle.

According to an example, each of a plurality speakers transduces the noise-cancellation signal into one of a plurality of noise-cancellation audio signals.

According to an example, the noise-cancellation audio signal reduces the road noise at frequencies less than 350 Hz.

Generally, in another aspect, a system for monitoring entertainment audio is provided. The system is configured to generate an entertainment audio monitor signal. The entertainment audio monitor signal corresponds to entertainment audio originating from an entertainment audio system of a vehicle.

The system is further configured to disable a noise-cancellation audio signal when an amplitude of the entertainment audio monitor signal is greater than a cancellation disable threshold.

The system is further configured to attenuate the noise-cancellation audio signal when the amplitude of the entertainment audio monitor signal is greater than a cancellation enable threshold. The attenuation of the noise-cancellation audio signal increases relative to the amplitude of the entertainment audio monitor signal when the amplitude of the entertainment audio monitor signal is less than the cancellation disable threshold.

According to an example, the system is further configured to disable adaptation of an adaptive filter when the amplitude of the entertainment audio monitor signal is greater than an adaptation freeze threshold. The system is further configured to, subsequent to disabling adaptation of the adaptive filter, enable adaptation of the adaptive filter when the amplitude of the entertainment audio monitor signal is less than an adaptation enable threshold. The noise-cancellation audio signal may be based on a noise-cancellation signal outputted by the adaptive filter.

According to an example, the entertainment audio monitor signal is based on at least one of one or more entertainment audio signals generated by the entertainment audio system. In a further example, the one or more entertainment audio signals include a left channel audio signal and a right channel audio signal. The entertainment audio monitor signal is an RMS estimate of the left channel audio signal and the right channel audio signal. In an even further example, the one or more entertainment audio signals further include a plurality of output audio channel signals based on the left channel audio signal and/or the right channel audio signal. The entertainment audio monitor signal is a weighted RMS estimate of the plurality of output audio channel signals.

Generally, in a further aspect, a method for monitoring entertainment audio is provided. The method includes generating an entertainment audio monitor signal corresponding to entertainment audio originating from an entertainment audio system of a vehicle.

The method further includes disabling a noise-cancellation audio signal when an amplitude of the entertainment audio monitor signal is greater than a cancellation disable threshold. The noise-cancellation audio signal is based on a noise-cancellation signal outputted by an adaptive filter of a noise-cancellation subsystem.

The method further includes attenuating the noise-cancellation audio signal when the amplitude of the entertainment audio monitor signal is greater than a cancellation enable threshold. The attenuation of the noise-cancellation audio signal increases relative to the amplitude of the entertainment audio monitor signal when the amplitude of the entertainment audio monitor signal is less than the cancellation disable threshold.

According to an example, the method further includes disabling adaptation of the adaptive filter when the amplitude of the entertainment audio monitor signal is greater than an adaptation freeze threshold. The method further includes, subsequent to disabling adaptation of the adaptive filter, enabling adaptation of the adaptive filter when the amplitude of the entertainment audio monitor signal is less than an adaptation enable threshold.

According to an example the method further includes generating a reference signal via an accelerometer. The method further includes generating an error signal via an error sensor. The method further includes adjusting the adaptive filter according to the reference signal and the error signal.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also can appear in any disclosure incorporated by reference should be accorded a meaning most consistent with the particular concepts disclosed herein.

Other features and advantages will be apparent from the description and the claims.

DETAILED DESCRIPTION

An adaptive noise-cancellation system employs the use of at least one reference signal from a reference sensor in order to generate a noise-cancellation signal. If the noise-cancellation system is deployed in a vehicle, the reference sensors are typically accelerometers operably mounted to the vehicle to detect vibrations in the chassis, which are transduced by the chassis into what is perceived by a passenger as road noise. If the entertainment audio system of the vehicle is playing loud music (specifically loud music with deep bass hits or thumps), the music may cause vibrations in the car that excite the accelerometers. This may give the noise-cancellation system a false indication of road noise, and thus cause it to play this excitation through secondary noise-cancellation speakers. Playing this excitation through the secondary noise-cancellation speakers can corrupt the accelerometers and/or muddle the entertainment audio within the cabin of the vehicle. Further, at particular loud volumes, the music may completely overwhelm any road noise, thus eliminating the need for road noise-cancellation.

The provided system for monitoring entertainment audio addresses the aforementioned problems. The system utilizes two sets of thresholds. The first set of thresholds triggers the system to enable or disable the adaptation of an adaptive filter of the noise-cancellation system. The second set of thresholds triggers the system to enable, attenuate, or disable the noise-cancellation signal. Accordingly, as the entertainment audio increases in volume and magnitude, the system first disables the adaptation of the adaptive filter, then attenuates the noise-cancellation signal, then completely disables the noise-cancellation signal. Conversely, as the entertainment audio decreases, the system first enables the noise-cancellation signal, then reduces the attenuation (thereby increasing the amplitude) of the noise-cancellation signal, and then enables the adaptation of the adaptive filter.

The system can monitor the entertainment based on the signals generated by the entertainment audio system. For example, the system can monitor the left and right audio channel signals generated by the entertainment audio system. In an alternative example, the system monitors the numerous output audio channel signals provided to the vehicle loudspeakers. The system can perform a weighted or un-weighted root-mean-squared (RMS) calculation of the monitored signals to determine an entertainment audio monitor signal. The system then controls the adaptation of the adaptive filter and the noise-cancellation signal based on the relationship of the entertainment audio monitor signal and the aforementioned thresholds.

Figure 1:
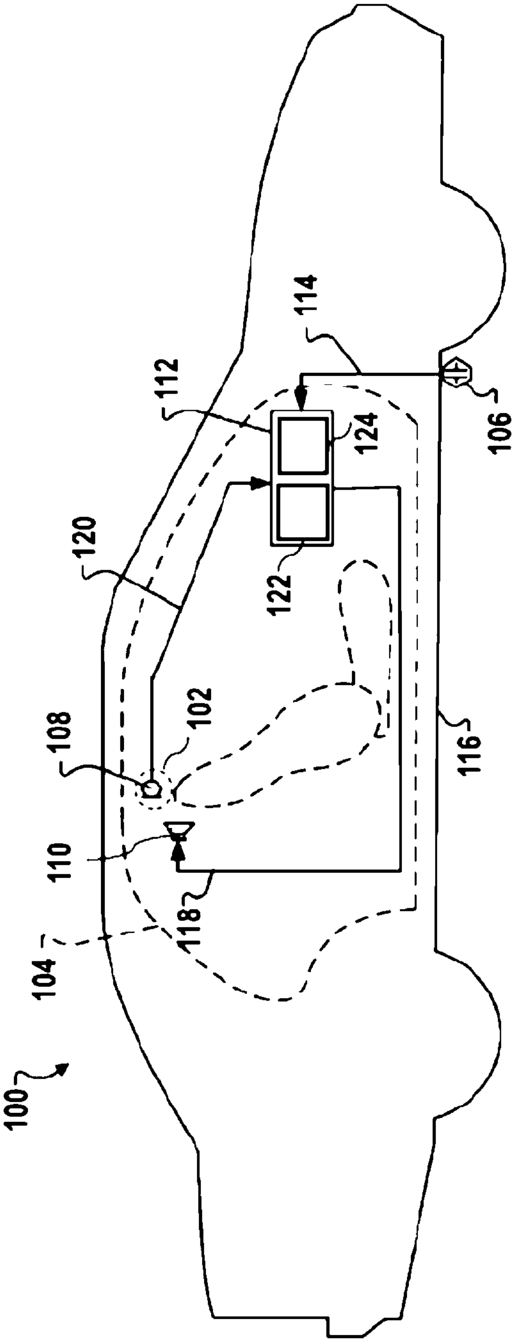
FIG. 1 depicts a schematic of a road noise-cancellation system, according to an example.
Figure 2:
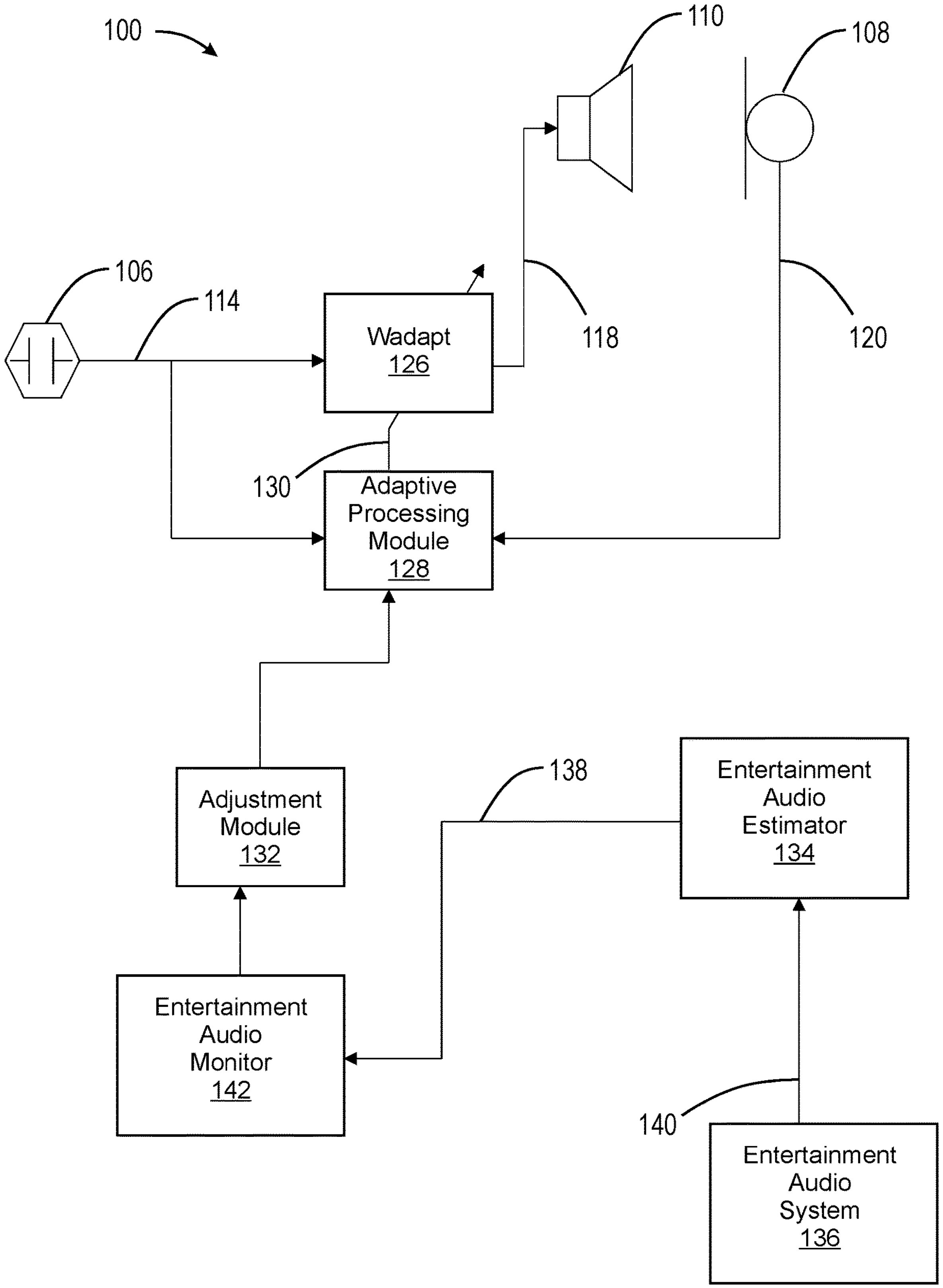
FIG. 2 depicts a block diagram of a road noise-cancellation system, according to an example.

An example of such a vehicle-implemented noise-cancellation system will be briefly described, for purposes of illustration, in connection with FIGS. 1 and 2. FIG. 1 is a schematic view of an example noise-cancellation system 100. Noise-cancellation system 100 can be configured to destructively interfere with undesired sound in at least one cancellation zone 102 within a predefined volume 104 such as a vehicle cabin. At a high level, an example of noise-cancellation system 100 can include a reference sensor 106, an error sensor 108, an actuator 110, and a controller 112.

In an example, reference sensor 106 is configured to generate noise signal(s) 114 representative of the undesired sound, or a source of the undesired sound, within predefined volume 104. For example, as shown in FIG. 1, reference sensor 106 can be an accelerometer, or a plurality of accelerometers, mounted to and configured to detect vibrations transmitted through a vehicle structure 116. Vibrations transmitted through the vehicle structure 116 are transduced by the structure into undesired sound in the vehicle cabin (perceived as road noise), thus an accelerometer mounted to the structure provides a signal representative of the undesired sound.

Actuator 110 can, for example, be speakers distributed in discrete locations about the perimeter of the predefined volume. In an example, four or more speakers can be disposed within a vehicle cabin, each of the four speakers being located within a respective door of the vehicle and configured to project sound into the vehicle cabin. In alternate examples, speakers can be located within a headrest, or elsewhere in the vehicle cabin.

A noise-cancellation signal 118 can be generated by controller 112 and provided to one or more speakers in the predefined volume, which transduce the noise-cancellation signal 118 to acoustic energy (i.e., sound waves). The acoustic energy produced as a result of noise-cancellation signal 118 is approximately 180° out of phase with—and thus destructively interferes with—the undesired sound within the cancellation zone 102. The combination of sound waves generated from the noise-cancellation signal 118 and the undesired noise in the predefined volume results in cancellation of the undesired noise, as perceived by a listener in a cancellation zone.

Because noise-cancellation cannot be equal throughout the entire predefined volume, noise-cancellation system 100 is configured to create the greatest noise-cancellation within one or more predefined cancellation zones 102 within the predefined volume. The noise-cancellation within the cancellation zones can reduce undesired sound by approximately 3 dB or more (although in varying examples, different amounts of noise-cancellation can occur). Furthermore, the noise-cancellation can cancel sounds in a range of frequencies, such as frequencies less than approximately 350 Hz (although other ranges are possible).

Error sensor 108, disposed within the predefined volume, generates an error sensor signal 120 based on detection of residual noise resulting from the combination of the sound waves generated from the noise-cancellation signal 118 and the undesired sound in the cancellation zone. The error sensor signal 120 is provided to controller 112 as feedback, error sensor signal 120 representing residual noise uncanceled by the noise-cancellation signal. Error sensors 108 can be, for example, at least one microphone mounted within a vehicle cabin (e.g., in the roof, headrests, pillars, or elsewhere within the cabin).

It should be noted that the cancellation zone(s) can be positioned remotely from error sensor 108. In this case, the error sensor signal 120 can be filtered to represent an estimate of the residual noise in the cancellation zone(s). In either case, the error signal will be understood to represent residual undesired noise in the cancellation zone.

In an example, controller 112 can comprise a nontransitory storage medium 122 and processor 124. In an example, non-transitory storage medium 122 can store program code that, when executed by processor 124, implements the various filters and algorithms described below. Controller 112 can be implemented in hardware and/or software. For example, the controller can be implemented by a SHARC floating-point DSP processor, but it should be understood that controller 112 can be implemented by any other processor, FPGA, ASIC, or other suitable hardware.

FIG. 2 shows a block diagram of an example of noise-cancellation system 100, including a plurality of filters implemented by controller 112. As shown, the controller can define a control system including $W_{adapt}$ filter 126 and an adaptive processing module 128.

$W_{adapt}$ filter 126 is configured to receive the noise signal 114 of reference sensor 106 and to generate noise-cancellation signal 118. Noise-cancellation signal 118, as described above, is input to actuator 110 where it is transduced into the noise-cancellation audio signal that destructively interferes with the undesired sound in the predefined cancellation zone 102. $W_{adapt}$ filter 126 can be implemented as any suitable linear filter, such as a multi-input multi-output (MIMO) finite impulse response (FIR) filter. $W_{adapt}$ filter 126 employs a set of coefficients which define the noise-cancellation signal 118 and which can be adjusted to adapt to changing behavior of the vehicle response to road input (or to other inputs in non-vehicular noise-cancellation contexts).

The adjustments to the coefficients can be performed by an adaptive processing module 128, which receives as inputs the error sensor signal 120 and the noise signal 114 and, using those inputs, generates a filter update signal 130. The filter update signal 130 is an update to the filter coefficients implemented in $W_{adapt}$ filter 126. The noise-cancellation signal 118 produced by the updated $W_{adapt}$ filter 126 will minimize error sensor signal 120, and, consequently, the undesired noise in the cancellation zone.

The coefficients of $W_{adapt}$ filter 126 at time step n can be updated according to the following equation:

$$W_{adapt}[n+1] = W_{adapt}[n] + \mu\left(\tilde{T}'_{de} * e\right)\frac{x}{\|x\|_2} \qquad (1)$$

where $\tilde{T}_{de}$ is an estimate of the physical transfer function between actuator 110 and the noise-cancellation zone 102, $\tilde{T}'_{de}$ is the conjugate transpose of $\tilde{T}_{de}$, e is the error signal, and x is the output signal of reference sensor 106. In the update equation, the output signal x of reference sensor is divided by the norm of x, represented as $\|x\|_2$.

In application, the total number of filters is generally equal to the number of reference sensors (M) multiplied by the number of speakers (N). Each reference sensor signal is filtered N times, and each speaker signal is then obtained as a summation of M signals (each sensor signal filtered by the corresponding filter).

Noise-cancellation system 100 further includes an adjustment module 132 configured to vary at least one of a power of the noise-cancellation signal 118 and rate of adaptation of the adaptive filter $W_{adapt}$ filter 126 as implemented by the adaptive processing module 128. The adjustment module 132 varies the noise-cancellation signal 118 and/or the rate of adaptation of the adaptive filter 126 according to the voltage of one or more entertainment audio signals 140 generated by the entertainment audio system 136. These entertainment audio signals 140 are, either directly or following further processing, transduced by one or more loudspeakers to produce entertainment audio, such as music. For example, the vehicle can include several loudspeakers placed around the vehicle to form a surround sound subsystem. In some examples, as many as 16 or 32 loudspeakers are used in a vehicle. As noted previously, loud music with deep bass sounds can vibrate the reference sensor 106 (such as an accelerometer) to generate a noise signal 114 falsely indicative of road noise. The noise-cancellation signal 118 created to cancel this non-existent road noise can muddle the entertainment audio played in the cabin.

An entertainment audio estimator 134 generates a single entertainment audio monitor signal 138 based on the one or more entertainment audio signals 140. The entertainment audio monitor signal 138 can be an RMS estimate of the one or more entertainment audio signals 140. For example, the one or more entertainment audio signals 140 can include a left channel audio signal 140*a* and a right channel audio signal 140*b*, such as the left and right channel of a stereo audio track on a compact disc, digital music file, or digital music stream played by the entertainment audio system 136. The entertainment audio monitor signal 138 can then be an RMS estimate of the left channel audio signal 140*a* and the right channel audio signal 140*b*. While this example describes the entertainment audio monitor signal 138 as the result of an RMS estimate of one or more audio signals, in further examples the entertainment audio monitor signal 138 could be any other metric or figure corresponding to the loudness of entertainment audio within the vehicle.

According to a further example, the one or more entertainment audio signals 140 can include a plurality of output audio channel signals. The entertainment audio system 136 can generate an output audio channel signal for each loudspeaker positioned in the vehicle based on the left channel audio signal 140*a* and/or the right channel audio signal 140*b*. The output audio channel signals can vary based on a wide range of factors, such as loudspeaker type (woofer, tweeter, mid-range driver, etc.), loudspeaker frequency range, loudspeaker vehicle placement, vehicle audio tuning, etc. The entertainment audio monitor signal 138 can be a weighted RMS estimate of the plurality of output audio channel signals.

Ideally, the entertainment audio signals 140 used to generate the entertainment audio monitor signal 138 reflect the entertainment audio played by the loudspeakers as closely as possible. In one example, entertainment audio signals 140 have been processed by one or more equalizers. The equalizers can be used to tune the entertainment audio to spatial and/or acoustic features of the vehicle, or simply to account for user preferences. In a further example, the entertainment audio monitor signal 138 may be generated based on a specific frequency range of the entertainment audio signals 140.

The entertainment audio monitor signal 138 generated by the entertainment audio estimator 134 is provided to an entertainment audio monitor 142. The entertainment audio monitor 142 controls the adjustment module 132 to prevent muddling of the entertainment audio played in the vehicle. The entertainment audio monitor 134 tracks the magnitude of the entertainment audio monitor signal 138 and compares the magnitude to two sets of thresholds. A first set of thresholds 142, 144 enables or disables the adaptation of the adaptive filter 126. A second set of thresholds 146, 148 controls the strength of the noise-cancellation signal 118.

The first two thresholds (adaptation freeze threshold 142 and adaptation enable threshold 144) work on practically turning on and off the adaptation of the adaptive filter 126 (and therefore the noise-cancellation system as a whole) by following hysteresis. If the entertainment audio monitor signal 138 exceeds the adaptation freeze threshold 142, the entertainment audio in the vehicle may be loud enough to corrupt the reference sensors 106 (e.g., accelerometers). If the noise-cancellation system 100 is allowed to adapt, the system 100 may adapt to the entertainment audio (rather than any road noise) and essentially muddle the desired entertainment audio. Therefore, when the entertainment audio monitor signal 138 exceeds this adaptation freeze threshold 142, the system 100 (via adjustment module 132) can stop the road noise-cancellation adaptation by setting the adaptation step size to 0. The adaptive filter 126 can adapt again only when the entertainment audio monitor signal 138 subsequently dips below the adaptation enable threshold 144.

The second set of two thresholds (cancellation enable threshold 146 and cancellation disable threshold 148) serve a different purpose. A driver's choice of the loudness of entertainment audio is subjective, and at a certain point (corresponding to the cancellation enable threshold) entertainment audio may be so loud that it starts to mask all road noise. When road noise is not the dominating audible component in the vehicle cabin, road noise-cancellation is no longer necessary. So, to forego the road noise-cancellation whenever the entertainment audio reaches this loud volume, when the entertainment audio monitor signal 138 exceeds a cancellation enable threshold 146, road noise-cancellation is disabled by ramping down the speaker gain associated with actuator 110 from 1 to 0. Alternatively, the noise-cancellation signal 118 may be ramped down by an attenuator prior to reception by actuator 110. When the entertainment audio monitor signal 138 exceeds the cancellation disable threshold 148, the road noise-cancellation system 100 is entirely disabled by setting the speaker gain to 0.

Figure 3:
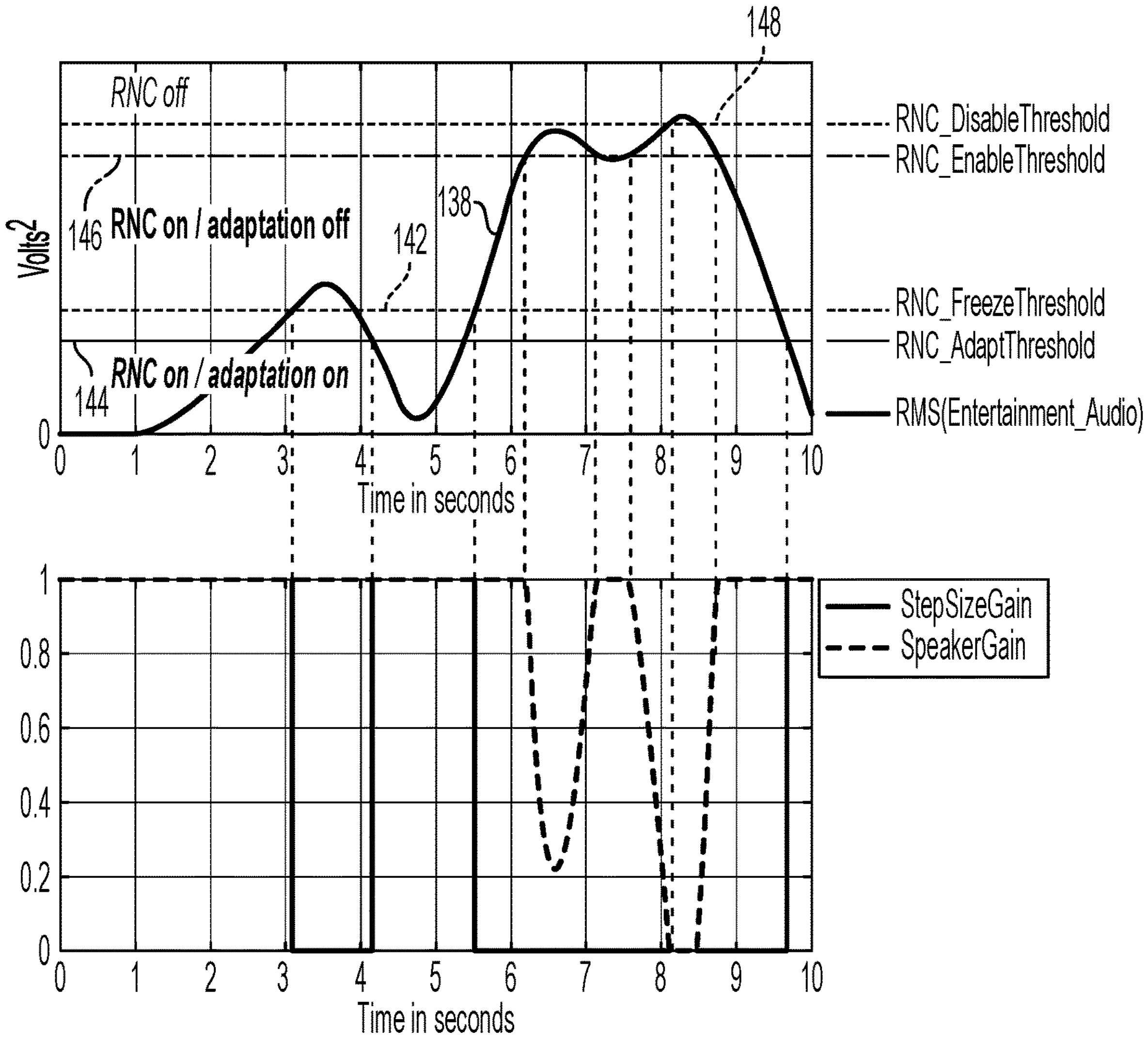
FIG. 3 depicts thresholds controlling a road noise-cancellation system and the response of the system to the thresholds, according to an example.

FIG. 3 shows how the entertainment audio monitor signal 138 may be used to control the adaptation of the adaptive filter 126 and the magnitude of the road noise-cancellation signal 118 according to the four thresholds 142, 144, 146, 148 defined above. As shown in FIG. 3, the entertainment audio monitor signal 138 increases after the one second mark such that it crosses the adaptation freeze threshold 142 just after the three second mark. At this point, the adaptation of the adaptive filter 126 is disabled, and remains disabled until the entertainment audio monitor signal 138 dips below the adaptation enable threshold 144 just after the four second mark. Adaptation remains enabled until the entertainment audio monitor signal 138 again exceeds adaptation freeze threshold 142 in between the five and six second mark. The entertainment audio monitor signal 138 then exceeds the cancellation enable threshold 146 from just after the six second mark to just after the seven second mark, and again at around the 7.5 second mark to the eight second mark. During these periods, the noise-cancellation audio signal 118 is attenuated relative to the amplitude of the entertainment audio monitor signal 138. The entertainment audio monitor signal 138 then exceeds the cancellation disable threshold 148 from just after the eight second mark to approximately the 8.5 second mark. During this period, the road noise-cancellation audio signal 118 is disabled entirely, and the system 100 does not cancel any road noise. Road noise-cancellation is re-enabled after the 8.5 second mark, and is amplified between the 8.5 second mark and the 8.75 second mark. Lastly, as the entertainment audio monitor signal 118 continues to decrease after the 8.75 second mark, the noise-cancellation signal 118 is no longer attenuated.

Filter 126 adaptation is re-enabled when the entertainment audio monitor signal 138 dips below the adaptation enable threshold 144 at approximately 9.75 seconds.

In a further example, the entertainment audio monitor 142 may employ additional thresholds to disable/enable additional vehicle subsystems. For example, audio generated by an electric vehicle pedestrian warning system, such as an Acoustic Vehicle Alerting System (AVAS), may be enabled, disabled, amplified, and/or attenuated according to the entertainment audio monitor signal 138.

The noise-cancellation systems 100 described above are merely provided as examples of such a system 100. This system 100, variants of this system 100, and other suitable noise-cancellation systems can be used within the scope of this disclosure.

Figure 4:
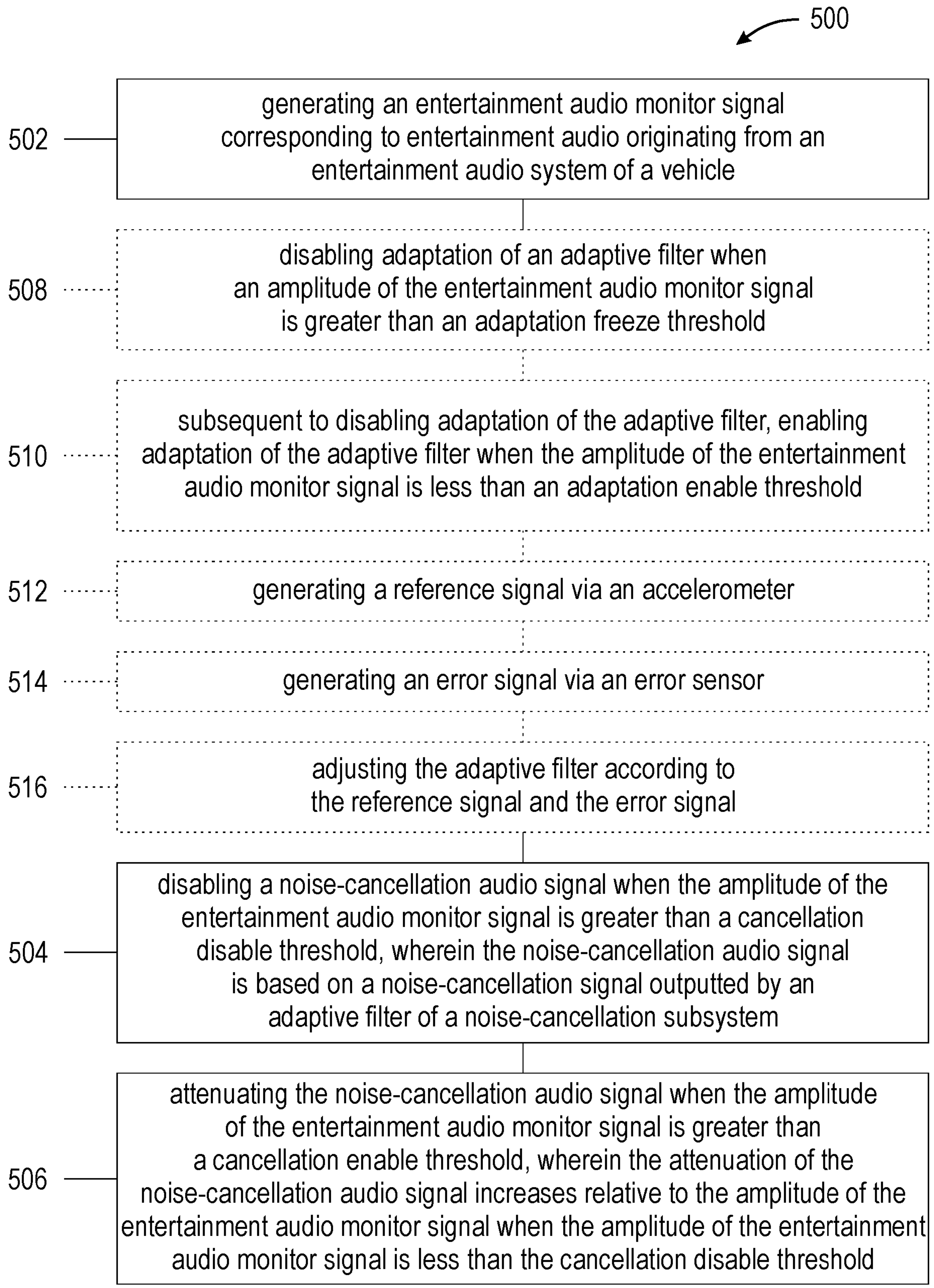
FIG. 4 depicts a flowchart of a method for monitoring entertainment audio, according to an example.

FIG. 4 depicts a flowchart of a method 500 for monitoring entertainment audio is provided. The method 500 includes generating 502 an entertainment audio monitor signal corresponding to entertainment audio originating from an entertainment audio system of a vehicle.

The method 500 further includes disabling 504 a noise-cancellation audio signal when an amplitude of the entertainment audio monitor signal is greater than a cancellation disable threshold. The noise-cancellation audio signal is based on a noise-cancellation signal outputted by an adaptive filter of a noise-cancellation subsystem.

The method 500 further includes attenuating 506 the noise-cancellation audio signal when the amplitude of the entertainment audio monitor signal is greater than a cancellation enable threshold. The attenuation of the noise-cancellation audio signal increases relative to the amplitude of the entertainment audio monitor signal when the amplitude of the entertainment audio monitor signal is less than the cancellation disable threshold.

According to an optional example, the method 500 further includes disabling 508 adaptation of the adaptive filter when the amplitude of the entertainment audio monitor signal is greater than an adaptation freeze threshold. The method 500 further includes, subsequent to disabling adaptation of the adaptive filter, enabling 510 adaptation of the adaptive filter when the amplitude of the entertainment audio monitor signal is less than an adaptation enable threshold.

According to a further optional example, the method 500 further includes generating 512 a reference signal via an accelerometer. The method 500 further includes generating 514 an error signal via an error sensor. The method 500 further includes adjusting 516 the adaptive filter according to the reference signal and the error signal.

For the purposes of this disclosure, any instance of an equation being used to determine a value (e.g., the equations used to determine the intermediate values) can be implemented as a look-up table, the values of which are dictated by the equation, or can be calculated in real time.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A vehicle implemented noise-cancellation system, comprising:

- a noise-cancellation subsystem disposed in a vehicle, the noise-cancellation subsystem comprising an adaptive filter being adjusted according to a reference signal and an error signal, the adaptive filter outputting a noise-cancellation signal, which, when transduced into a noise-cancellation audio signal by a speaker, reduces road noise within at least one zone within a cabin of the vehicle; and
- an entertainment audio monitoring subsystem, configured to:
  - generate an entertainment audio monitor signal corresponding to audio originating from an entertainment audio system of the vehicle;
  - disable the noise-cancellation audio signal when an amplitude of the entertainment audio monitor signal is greater than a cancellation disable threshold; and attenuate the noise-cancellation audio signal when the amplitude of the entertainment audio monitor signal is greater than a cancellation enable threshold, wherein the attenuation of the noise-cancellation audio signal increases relative to the amplitude of the entertainment audio monitor signal when the amplitude of the entertainment audio monitor signal is less than the cancellation disable threshold.

2. The vehicle implemented noise-cancellation system of claim 1, wherein the entertainment audio monitoring subsystem is further configured to:

disable adaptation of the adaptive filter when the amplitude of the entertainment audio monitor signal is greater than an adaptation freeze threshold; and subsequent to disabling adaptation of the adaptive filter, enable adaptation of the adaptive filter when the amplitude of the entertainment audio monitor signal is less than an adaptation enable threshold.

3. The vehicle implemented noise-cancellation system of claim 1, wherein the entertainment audio monitor signal is based on at least one of one or more entertainment audio signals generated by the entertainment audio system.

4. The vehicle implemented noise-cancellation system of claim 3, wherein the one or more entertainment audio signals comprise a left channel audio signal and a right channel audio signal, and wherein the entertainment audio monitor signal is a root-mean-square (RMS) estimate of the left channel audio signal and the right channel audio signal.

5. The vehicle implemented noise-cancellation system of claim 4, wherein the one or more entertainment audio signals further comprise a plurality of output audio channel signals based on the left channel audio signal and/or the right channel audio signal, and wherein the entertainment audio monitor signal is a weighted RMS estimate of the plurality of output audio channel signals.

6. The vehicle implemented noise-cancellation system of claim 1, further comprising an accelerometer configured to generate the reference signal.

7. The vehicle implemented noise-cancellation system of claim 6, wherein the accelerometer is arranged to detect vibrations in a chassis of the vehicle.

8. The vehicle implemented noise-cancellation system of claim 1, wherein the error signal is generated by an error sensor arranged within the cabin of the vehicle.

9. The vehicle implemented noise-cancellation system of claim 8, wherein the error sensor is arranged within one of the at least one zone within the cabin of the vehicle.

10. The vehicle implemented noise-cancellation system of claim 1, wherein each of a plurality speakers transduces the noise-cancellation signal into one of a plurality of noise-cancellation audio signals.

11. The vehicle implemented noise-cancellation system of claim 1, wherein the noise-cancellation audio signal reduces the road noise at frequencies less than 350 Hz.

12. A system for monitoring entertainment audio configured to:

generate an entertainment audio monitor signal corresponding to entertainment audio originating from an entertainment audio system of a vehicle;

disable a noise-cancellation audio signal when an amplitude of the entertainment audio monitor signal is greater than a cancellation disable threshold; and attenuate the noise-cancellation audio signal when the amplitude of the entertainment audio monitor signal is greater than a cancellation enable threshold, wherein the attenuation of the noise-cancellation audio signal increases relative to the amplitude of the entertainment audio monitor signal when the amplitude of the entertainment audio monitor signal is less than the cancellation disable threshold.

13. The system of claim 12, further configured to:

disable adaptation of an adaptive filter when the amplitude of the entertainment audio monitor signal is greater than an adaptation freeze threshold; and subsequent to disabling adaptation of the adaptive filter, enable adaptation of the adaptive filter when the amplitude of the entertainment audio monitor signal is less than an adaptation enable threshold.

14. The system of claim 13, wherein the noise-cancellation audio signal is based on a noise-cancellation signal outputted by the adaptive filter.

15. The system of claim 12, wherein the entertainment audio monitor signal is based on at least one of one or more entertainment audio signals generated by the entertainment audio system.

16. The system of claim 15, wherein the one or more entertainment audio signals comprise a left channel audio signal and a right channel audio signal, and wherein the entertainment audio monitor signal is a root-mean-square (RMS) estimate of the left channel audio signal and the right channel audio signal.

17. The system of claim 16, wherein the one or more entertainment audio signals further comprise a plurality of output audio channel signals based on the left channel audio signal and/or the right channel audio signal, and wherein the entertainment audio monitor signal is a weighted RMS estimate of the plurality of output audio channel signals.

18. A method for monitoring entertainment audio, comprising:

generating an entertainment audio monitor signal corresponding to entertainment audio originating from an entertainment audio system of a vehicle;

disabling a noise-cancellation audio signal when an amplitude of the entertainment audio monitor signal is greater than a cancellation disable threshold, wherein the noise-cancellation audio signal is based on a noise-cancellation signal outputted by an adaptive filter of a noise-cancellation subsystem; and attenuating the noise-cancellation audio signal when the amplitude of the entertainment audio monitor signal is greater than a cancellation enable threshold, wherein the attenuation of the noise-cancellation audio signal increases relative to the amplitude of the entertainment audio monitor signal when the amplitude of the entertainment audio monitor signal is less than the cancellation disable threshold.

19. The method of claim 18, further comprising:

disabling adaptation of the adaptive filter when the amplitude of the entertainment audio monitor signal is greater than an adaptation freeze threshold; and subsequent to disabling adaptation of the adaptive filter, enabling adaptation of the adaptive filter when the amplitude of the entertainment audio monitor signal is less than an adaptation enable threshold.

20. The method of claim 18, further comprising:

generating a reference signal via an accelerometer;

generating an error signal via an error sensor; and adjusting the adaptive filter according to the reference signal and the error signal.

* * * * *